United States Patent [19]

Simon et al.

[11] Patent Number: 4,554,707
[45] Date of Patent: Nov. 26, 1985

[54] METHOD OF TREATING PIGSKIN

[75] Inventors: Fritz Simon; Klaus Körber; Horst Bandelow, all of Berlin; Michael Scherer, Hilbersdorf; Dieter Wilke, Berlin; Werner Thron, Berlin; Gerhard Preuk, Berlin, all of German Democratic Rep.

[73] Assignee: VE Fleischkombinat Berlin, Berlin, German Democratic Rep.

[21] Appl. No.: 631,918

[22] Filed: Jul. 18, 1984

[51] Int. Cl.[4] .................................................. A22B 5/08
[52] U.S. Cl. ............................................ 17/47; 17/15; 17/20
[58] Field of Search ..................... 17/13, 14, 15, 20, 47

[56] References Cited

U.S. PATENT DOCUMENTS 3,119,145  1/1964  Weprin ................................ 17/14 X
3,520,011  7/1970  Lehman et al. ..................... 17/47 X Primary Examiner—Willie G. Abercrombie
Attorney, Agent, or Firm—Karl F. Ross; Herbert Dubno

[57] ABSTRACT

A method of producing pigskin comprises the steps of sequentially scalding the unprocessed pig carcass in a liquid bath at a temperature of substantially 57° to 59° C. for about 5.5 minutes, removing the carcass from the bath after scalding for 5.5 minutes therein, stripping the hide off the carcass, and singeing the hide. The temperature of the bath is held substantially constant by a microelectronically controlled valve that admits steam to the bath. The carcass is displaced through the bath as it is scalded by a rake- or scraper-type conveyor which holds the carcass wholly immersed while moving it. Thus the carcass is scalded by being immersed at one end of an elongated bath, pushed along the bath, and lifted out of the bath at the opposite end thereof about 5.5 min later.

5 Claims, 1 Drawing Figure

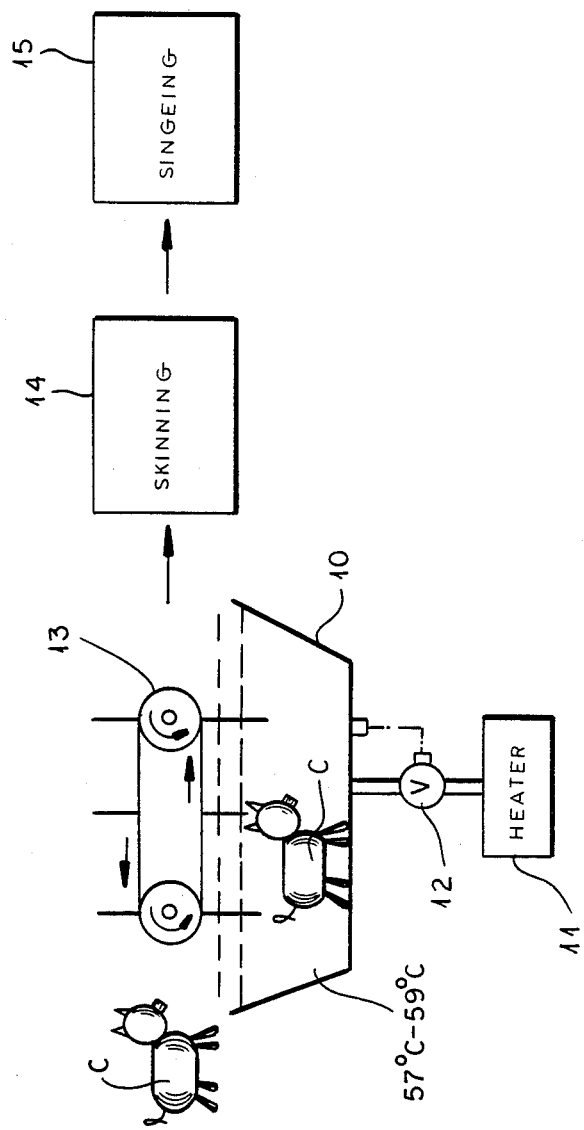

METHOD OF TREATING PIGSKIN

FIELD OF THE INVENTION

The present invention relates to a method of treating pigskin. More particularly this invention concerns such a method which recovers a tannable hide from a fresh pig carcass.

BACKGROUND OF THE INVENTION

The standard method of processing pig skin entails putting the carcass in a vessel so that the lower body surfaces—belly, legs, and hams—and the upper body portion—head, shoulders, and back—can be sprayed with hot water of 68° C. to 70° C. This loosens and softens the bristles, hard parts, and outer skin layer.

It is also known to use jets of steam to thus treat the skin while still on the carcass with heat and moisture. This method is fairly complex and usually results in uneven treatment of the skin as carcasses of different sizes are subject to the same treatment.

Subsequently the skin is singed, that is briefly exposed to a gas flame, to remove the remaining bristles and hair. It is then stripped from the carcass. The back skin is processed according to standard tanning techniques which normally damage another 10% of the material.

The main disadvantage of these systems is that a great deal of the skin is damaged either mechanically or thermally. Holes are poked and excessive heat breaks down the internal protein. In fact, a substantial portion of the skins recovered are so seriously damaged as to be unusable.

OBJECTS OF THE INVENTION

It is therefore an object of the present invention to provide an improved method of processing pig skins.

Another object is the provision of such a method of processing pig skins which overcomes the above-given disadvantages, that is which treats the skins fairly gently so that there is little damage to them, and that produces very uniform results.

SUMMARY OF THE INVENTION

A method of producing pigskin according to this invention comprises the steps of sequentially scalding the unprocessed pig carcass in a liquid bath at a temperature of substantially 57° to 59° C. for about 5.5 minutes, removing the carcass from the bath after scalding for 5.5 minutes therein to terminate the treatment of the skin, stripping the hide off the carcass, and singeing the hide.

Use of such a relatively low temprature loosens the bristles, the outer dead skin layer, and the hooves or calloused portions, while wholly avoiding any damage to the essential protein of the skin. Thus the skin that is treated in this manner is as strong as a raw hide. This allows the recovery of a greater amount of usable skin per hide. Skinning the carcass before singeing the hide ensures that the singeing process can be carried out very exactly on a flat hide with no damage to it.

According to another feature of this invention the temperature of the bath is held substantially constant. A microelectrically controlled valve that admits steam to the bath can be used to maintain very accurate temperature control.

In accordance with another inventive feature the carcass is displaced through the bath as it is scalded. This is done by a rake- or scraper-type conveyor which holds the carcass wholly immersed while moving it. Thus the carcass is scalded by being immersed at one end of an elongated bath, pushed along the bath, and lifted out of the bath at the opposite end thereof about 5.5 min later.

It is also possible according to the invention to remove the hair from the hide after the scalding but before stripping the hide from the carcass.

DESCRIPTION OF THE DRAWING

The above and other features and advantages will become more readily apparent from the following, reference being made to the accompanying drawing whose sole FIGURE is a schematic representation of the system for carrying out the method of this invention.

SPECIFIC DESCRIPTION

As seen in the drawing a fresh and untreated pig carcass C is dropped into one end of a vat 10 containing a bath of water maintaned by a heater 11 and electronic thermostatically operated valve 12 at a temperature of no less than 57° C. and no more than 59° C. A rake-type conveyor 13 pushes this carcass C along the vat 10 while holding it submerged, so that the transit time in the vat 10 is 5.5 minutes.

Thus no matter what size the carcass C is, it will be treated for exactly 5.5 minutes. This treatment softens the bristles, dead outer skin layer, hooves, and hard parts of the hide.

Subsequently the hide H is cut off the carcass C at 14 and passed through a singeing unit 15 that removes the bristles.

Such a procedure can increase the quantity of usable hides produced in a day by 40%.

We claim:

1. A method of producing pigskin, the method comprising the steps of sequentially:
    scalding the unprocessed pig carcass in a liquid bath at a temperature of substantially 57° to 59° C. for about 5.5 minutes;
    removing the carcass from the bath after scalding for 5.5 minutes therein;
    stripping the hide off the carcass; and
    singeing the hide.
2. The method defined in claim 1 wherein the temperature of the bath is held substantially constant.
3. The method defined in claim 1 wherein the carcass is displaced through the bath as it is scalded.
4. The method defined in claim 1, further comprising the step of
    removing the hair from the hide after the scalding but before stripping the hide from the carcass.
5. The method defined in claim 1 wherein the carcass is scalded by being immersed at one end of an elongated bath, pushed along the bath, and lifted out of the bath at the opposite end thereof about 5.5 min later.

* * * * *